US011062251B2

(12) United States Patent
Garrity et al.

(10) Patent No.: US 11,062,251 B2
(45) Date of Patent: Jul. 13, 2021

(54) MULTI-DIMENSIONAL COMMAND CENTER

(71) Applicant: SPRINKLR, INC., New York, NY (US)

(72) Inventors: Justin Trevor Garrity, Portland, OR (US); Ryan Robert Parr, North Plains, OR (US); David James Stewart, New York, NY (US)

(73) Assignee: SPRINKLR, INC., New York, NY (US)

( * ) Notice: Subject to any disclaimer, the term of this patent is extended or adjusted under 35 U.S.C. 154(b) by 0 days.

(21) Appl. No.: 16/740,149

(22) Filed: Jan. 10, 2020

(65) Prior Publication Data
US 2020/0226526 A1    Jul. 16, 2020

Related U.S. Application Data

(63) Continuation of application No. 14/997,013, filed on Jan. 15, 2016, now Pat. No. 10,535,029.

(Continued)

(51) Int. Cl.
*G06Q 10/06*  (2012.01)
*G06F 16/951*  (2019.01)
(Continued)

(52) U.S. Cl.
CPC ..... *G06Q 10/06393* (2013.01); *G06F 3/0482* (2013.01); *G06F 3/0485* (2013.01);
(Continued)

(58) Field of Classification Search
CPC ........... G06Q 10/06393; G06Q 10/063; G06Q 50/01; G06F 16/951; G06F 3/0482; G06F 3/0485; G06F 3/167; G06T 11/206
(Continued)

(56) References Cited

U.S. PATENT DOCUMENTS 8,655,938 B1   2/2014 Smith
9,201,955 B1   12/2015 Quintao
(Continued)

FOREIGN PATENT DOCUMENTS

WO   WO 2016/118425 A1   7/2016

OTHER PUBLICATIONS

Multimodal social intelligence in a real-time dashboard system. Gruhl, Daniel; Nagarajan, Meena; Pieper, Jan; Robson, Christine; Sheth, Amit. VLDB Journal 19.6: 825-848. Springer New York. (Jan. 1, 2010).*

(Continued)

*Primary Examiner* — Timothy Padot
(74) *Attorney, Agent, or Firm* — Schwabe Williamson & Wyatt

(57) ABSTRACT

A command center provides ad-hoc search and navigation through different dimensional topic levels that allow users to better analyze and correlate data. The command center not only generates and displays content and metrics associated with an event, but can also generate and display real-time content and metrics for other topics, products, and/or services related to a currently displayed topic. The command center enables a user to navigate through the different dimensional levels simply by selecting items displayed by a remote control application. The command center also automatically synchronizes the content and metrics for any selected dimension to a same corresponding time period.

22 Claims, 10 Drawing Sheets

Related U.S. Application Data

(60) Provisional application No. 62/107,285, filed on Jan. 23, 2015.

(51) Int. Cl.

| | | |
|---|---|---|
| *G06F 3/0482* | (2013.01) | |
| *G06F 3/0484* | (2013.01) | |
| *G06F 3/0485* | (2013.01) | |
| *G06F 3/16* | (2006.01) | |
| *G06Q 50/00* | (2012.01) | |
| *G06T 11/20* | (2006.01) | |

(52) U.S. Cl.
CPC .......... *G06F 3/04842* (2013.01); *G06F 3/167* (2013.01); *G06F 16/951* (2019.01); *G06Q 10/063* (2013.01); *G06Q 50/01* (2013.01); *G06T 11/206* (2013.01)

(58) Field of Classification Search
USPC ........................................................ 705/7.39
See application file for complete search history.

(56) References Cited

U.S. PATENT DOCUMENTS

| | | | |
|---|---|---|---|
| 9,218,610 | B2 | 12/2015 | Kandregula |
| 2001/0028369 | A1 | 10/2001 | Gallo |
| 2003/0187956 | A1 | 10/2003 | Belt |
| 2003/0220835 | A1* | 11/2003 | Barnes, Jr. ............ H04M 1/724 705/14.36 |
| 2004/0054819 | A1* | 3/2004 | Daimoto ................ G06F 3/167 710/1 |
| 2005/0050021 | A1 | 3/2005 | Timmons |
| 2005/0131909 | A1* | 6/2005 | Cavagnaro ............ G06F 16/951 |
| 2006/0184963 | A1 | 8/2006 | Snijder |
| 2007/0103583 | A1 | 5/2007 | Burnett |
| 2008/0284910 | A1 | 11/2008 | Erskine |
| 2011/0004827 | A1 | 1/2011 | Doerr |
| 2011/0098108 | A1 | 4/2011 | Kuper |
| 2011/0122155 | A1 | 5/2011 | Zechlin |
| 2011/0255748 | A1 | 10/2011 | Komoto |
| 2011/0307312 | A1* | 12/2011 | Goeldi ............... G06Q 30/0251 705/14.6 |
| 2011/0320948 | A1 | 12/2011 | Choi |
| 2012/0110427 | A1 | 5/2012 | Krause |
| 2012/0134536 | A1 | 5/2012 | Myokan |
| 2012/0291059 | A1 | 11/2012 | Roberts |
| 2013/0124653 | A1* | 5/2013 | Vick ...................... H04L 51/32 709/206 |
| 2013/0166379 | A1* | 6/2013 | Ehindero ............... G06Q 30/02 705/14.52 |
| 2013/0297581 | A1 | 11/2013 | Ghosh |
| 2013/0297694 | A1* | 11/2013 | Ghosh ................... H04L 67/02 709/204 |
| 2014/0040029 | A1 | 2/2014 | Vhora |
| 2014/0156341 | A1 | 6/2014 | Kruk |
| 2014/0222578 | A1 | 8/2014 | Poornachandran |
| 2014/0232616 | A1* | 8/2014 | Drake ................ G06Q 30/0631 345/1.2 |
| 2014/0280052 | A1* | 9/2014 | Alonso ................. G06Q 50/01 707/722 |
| 2014/0361954 | A1 | 12/2014 | Epstein |
| 2015/0019335 | A1 | 1/2015 | Zhou |
| 2015/0031389 | A1 | 1/2015 | Liu |
| 2015/0046269 | A1 | 2/2015 | Liu |
| 2015/0046781 | A1 | 2/2015 | Baker |
| 2015/0067075 | A1 | 3/2015 | Sheppard et al. |
| 2015/0088622 | A1* | 3/2015 | Ganschow ......... G06Q 30/0252 705/14.5 |
| 2015/0089429 | A1 | 3/2015 | Ghassabian |
| 2015/0112814 | A1 | 4/2015 | Stokes |
| 2015/0161633 | A1* | 6/2015 | Adams ............... G06Q 30/0204 705/7.33 |
| 2015/0187333 | A1 | 7/2015 | Loeffler |
| 2015/0213119 | A1* | 7/2015 | Agarwal ................ G06Q 50/01 707/737 |
| 2015/0235239 | A1* | 8/2015 | Chowdhary .......... G06Q 50/01 705/7.31 |
| 2015/0279037 | A1 | 10/2015 | Griffin |
| 2016/0088362 | A1 | 3/2016 | Kaneko et al. |
| 2016/0140627 | A1 | 5/2016 | Moreau |
| 2016/0155389 | A1 | 6/2016 | Beon |
| 2016/0217408 | A1 | 7/2016 | Garrity |
| 2016/0225017 | A1 | 8/2016 | Wong |
| 2016/0343040 | A1 | 11/2016 | Garrity |
| 2017/0061469 | A1 | 3/2017 | Garrity |
| 2017/0084246 | A1 | 3/2017 | Joshi |
| 2018/0260185 | A1 | 9/2018 | Garrity |
| 2019/0026788 | A1 | 1/2019 | Garrity |
| 2019/0094027 | A1 | 3/2019 | Xu |
| 2019/0102075 | A1 | 4/2019 | Naidoo |
| 2019/0265942 | A1 | 8/2019 | Yoshimura |
| 2020/0250395 | A1 | 8/2020 | Ross |
| 2020/0293258 | A1 | 9/2020 | Lin |

OTHER PUBLICATIONS

Gruhl, et al., "Multimodal social intelligence in a real-time dashboard system", VLDB Journal 19.6: 825-848; Springer New York; Jan. 1, 2010.

Guille et al. "SONDY: An open source platform for social dynamics mining and analysis" Proceedings of the ACM SIGMOD International Conference on Management of Data: 1005-1008. Association for Computing Machinery. (Jul. 30, 2013).

Henderson, Harry: "Encyclopedia of Computer Science and Technology" Nov. 1, 2008, Facts on File; 580 pages.

International Search Report and Written Opinion from the International Searching Authority for PCT/US2016/013680 dated Mar. 22, 2016; 12 pages.

Psaltis, Andrew G.; "Streaming Data Designing the Real-Time Pipeline" Jan. 16, 2015, Manning Publications; 12 pages.

Tanenbaum, Andrew S., et al.; "Distributed Systems: Principles and Paradigms (2nd Edition)" Prentice Hall; Oct. 12, 2006; 68 pages.

Trendsmap Announces First Real-Time Geographic Visualization for Twitter Trends Tracking Business Wire Sep. 22, 2009: NA.

Wikipedia: "Server (computing)", Internet Article Jan. 19, 2015; retrieved from the internet: <URL: https://en.wikipedia.org/w/index.php?title=Server_(computing)&oldid=643171056> retrieved on Mar. 14, 2016; 7 pages.

Krishnaprasad et al., "JuxtaView—A Tool for Interactive Visualization of Large Imagery on Scalable Tiled Displays", IEEE 2004, pp. 411-420 (2004).

Yamaoka et al., Visualization of High-Resolution Image Collections on Large Tiled Display Wall, Elsevier 2011, pp. 498-505 (2011).

McIntyre et al., Support for Multitaking and Background Awareness Using Interactive Peripheral Displays, ACM 2001, pp. 41-50 (2001).

\* cited by examiner

MULTI-DIMENSIONAL COMMAND CENTER

CROSS-REFERENCE TO RELATED APPLICATIONS

This application is a continuation of U.S. application Ser. No. 14/997,013, filed Jan. 15, 2016, which claims priority to U.S. Provisional Application No. 62/107,285, filed Jan. 23, 2015, the entire disclosures of which are incorporated herein by reference.

BACKGROUND

Analytic data is generated for different brands, companies, websites, campaigns, and just about any other product, event, or service. For example, analytic services may identify how many people access websites on different days, how many people purchase specific products, how many people click on online ads for a product, and the demographics for the different people responding to an email campaign about these products.

Social networks also produce analytic data associated with those products. For example, social networks allow users to post messages about products and even engage with posts by other users by commenting, indicating that they like the post, or rebroadcasting the post to their friends and followers. These social networks generate analytics for the user accounts, such as identifying the engagement numbers for these posts, the influence that these users have on other users on social media, the demographics of the users that are posting and engaging, as well as the number of followers related to the brand that represents the product.

Analytic services on their own may not effectively display the different analytic data and social media. For example, a company may launch a campaign to sell a particular product. The company may monitor their corporate website and generate analytics regarding the number of purchases, number of web page visits, and the demographics of the customers making the purchases. The company also may monitor social media, such as comments and posts made on the company social media accounts.

However, current computer systems may not allow a user to easily search, display, or navigate through all of the different types of content and metrics associated with different products or services. Current computer systems also may not synchronize the different content and metrics associated with the different products or services. For example, the computer system may use separate display screens for displaying different content or metrics for different products. However, the information on the display screens is not synchronized. When a user selects a new product or topic for displaying information on one of the display screens, the computer system does not automatically change all of the information on the other display screens to correspond with the new product or topic.

DETAILED DESCRIPTION

A command center synchronizes real-time multi-dimensional data on one or more display devices. The data may include content of social media messages, metrics for the social media messages, and any other financial or business data. Displaying and synchronizing social media content together with other metrics provides insight into both the statistical performance of a campaign or event and the ground level customer response to the campaign or event.

The command center provides ad-hoc search and navigation through different dimensional topic levels that allow users to better analyze and correlate data. For example, the command center not only generates and displays content and metrics associated with an event, but can also generate and display in real-time content and metrics for other topics, products, and/or services related to a currently displayed topic. The command center enables a user to navigate through the different dimensional levels simply by selecting items displayed by a remote control application. The command center also automatically synchronizes the content and metrics for any selected dimension to a same corresponding time period.

Figure 1:
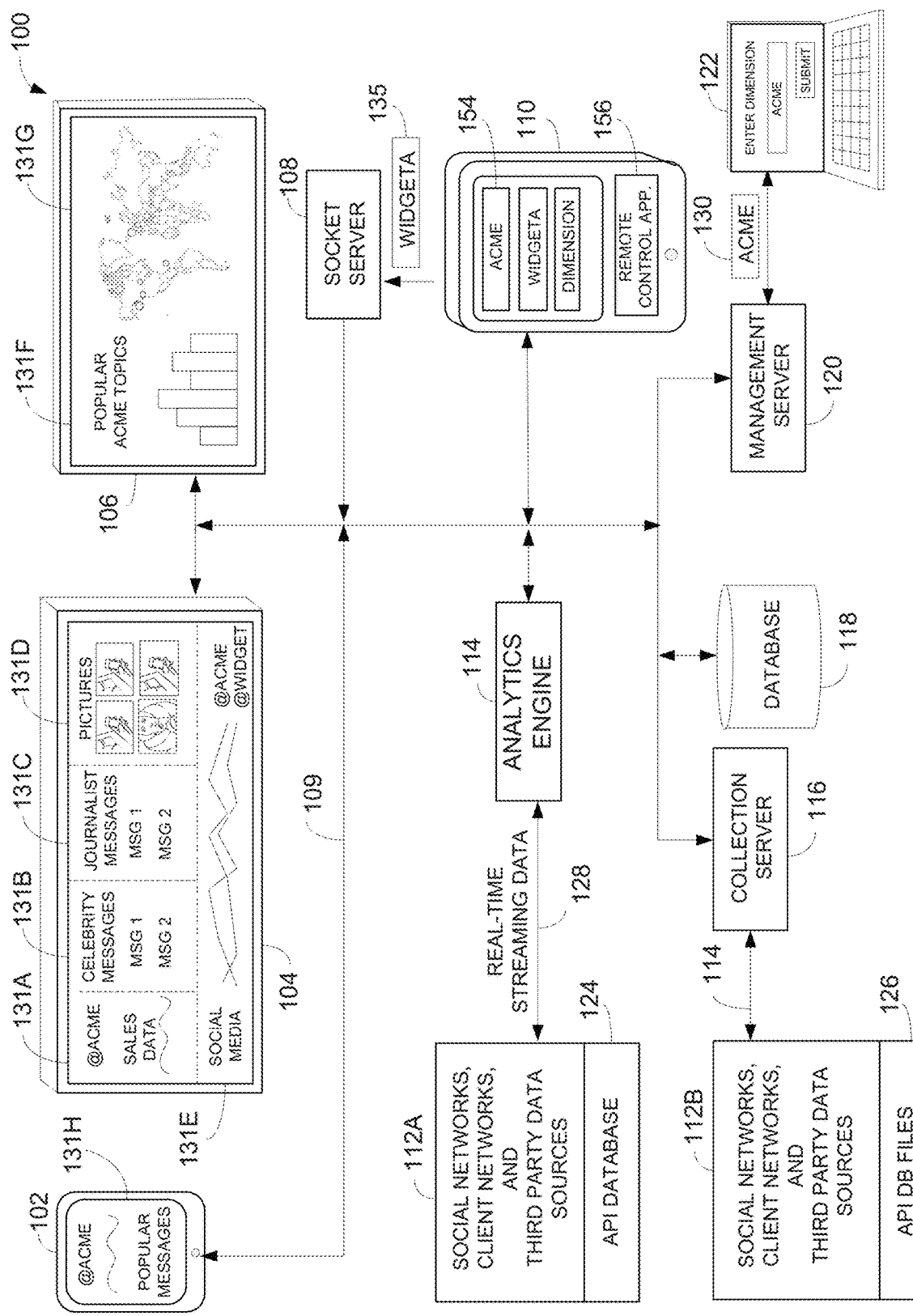
FIG. 1 depicts an example multi-dimensional command center.

FIG. 1 shows an example command center 100. An analytics engine 114 may connect to different display devices, such as a portable notebook, portable tablet, smart phone, smart watch, or personal computer 102. Display devices 104 and 106 may comprise display screens, such a light emitting diode (LED) screen, a liquid crystal display (LCD) screen, or any other type of flat screen or any other display device. Analytics engine 114 also connects to a tablet, smart phone, smart watch, or any other portable device 110 that can select what data is displayed on display devices 102, 104 and 106 with touch, voice, or gesture input.

Command center 100 may access data from different data sources 112, such as social networks, client networks, and third party websites. Social networks 112 may include websites, such as Twitter®, Facebook®, Instagram®, or the like. Client networks may include websites for a company, individual, or other entity associated with the data displayed on display devices 102, 104, and 106. For example, command center 100 may display data for an event sponsored by the Acme company. Client networks 112 may include the www.acme.com website and other Acme company databases. Command center 100 may download sales data, user visits, etc. associated with the web pages on www.acme.com from web analytic data sources as well as download any other data from the other identified Acme company databases.

Third party data sources 112 may include websites such as Adobe® or Google® analytics that monitor, measure, and generate metrics for other data sources or websites. Another example third party data source may include customized databases, such as created by Salesforce®, Salesforce® Radian6, or Sysomos® that provides access to marketing and sales data.

Some data sources 112 may provide more subjective data, such as content from posted messages that indicate what a user thinks of a particular event, service, or product. Some data sources 112 may provide more objective numerical data, such as company sales data, inventory data, financial data, spreadsheet data, website ecommerce data, wrist band radio frequency identification (RFID) reader data, number web page views, number of unique page views, time on web pages, starting web page, bounce rates, percentage of exists from web pages, or any other structured data contained in database systems.

Command center 100 uses application program interfaces (APIs) 124 and 126 to access data from data sources 112A and 112B, respectively. Some of data sources 112A and 112B may be the same, but are shown as separate sources in FIG. 1 for explanation purposes. For example, analytics engine 114 may use APIs 124 to extract real-time streaming data 128 from data sources 112A. A collection server 116 may use APIs 126 to extract and store data 114 from data sources 112B in a database 118. Streaming data 128 may be similar to data 114 but may include real-time updates to data currently stored in database 118.

A computer 122, such as a laptop, personal computer, notebook, or smart device identifies what data to extract from data sources 112. For example, a user may enter a keyword, data string, term, or any other combination of characters into computer 122 associated with a dimension 130. Dimension 130 may include any topic, segment, data category, gender, geography, time, content, metric, product, service, event, label, hashtag, gender, geography, time, content, metric, etc.

For example, dimension 130 may comprise the name of company or person, a name of a product or service, a brand name, a name for a campaign or event associated with a company or person, a name of a department within a company, a name of an account on a social website, a name of a subject or account, a hashtag associated with the person or company, a name of a competitor or competitive product, etc. Dimension 130 also may identify a particular content or category of data. For example, dimension 130 may specify content, such as celebrity posted messages associated with a particular product or event. Dimensions 130 also may specify a particular metric, such as number of posts, shared messages, responses to messages, comments on messages, likes, and/or trending items associated with the product, service, event, or topic.

Computer 122 may submit a list of dimensions 130 to a management server 120. Management server 120 may direct collection server 116 to extract data from data sources 112B associated with dimensions 130. Management server 120 also may direct analytics engine 114 to connect to data sources 112A and access streaming data 128 associated with dimensions 130.

Analytics engine 114 extracts and/or generates different metrics 131 from data 128 and 114. For example, analytics engine 114 may access sales data associated with dimension 130 and generate an associated graph 131A.

In the case of social media, analytics engine 114 may download messages 131B sent by different celebrities, messages 131C sent by different journalists, and images 131D sent by any variety of different users. Analytics engine 114 may accumulate all web traffic associated with dimensions 130 and generate time graphs 131E that identify the number of messages generated for the dimensions 130 for different time periods, such as every 30 minutes or every hour.

Analytics server 114 may generate additional content and metrics. For example, analytics engine 114 may generate a histogram 131F that identifies the number of messages associated with the most popular topics associated with Acme and generate a geographic map 131G that identifies the origination locations and numbers of social media messages associated with Acme. Analytics engine 114 also may generate a subset of content and metrics 131H for display on device 102. These are just examples of any variety of content and metrics 131 that may be downloaded and generated by analytics server 114.

Command center 100 provides the unique operation of synchronizing different content and metrics for different adhoc selected dimensions. For example, command center 100 displays corporate sales figures on timeline 131A and social media traffic in timelines 131E over the same time period. In addition, command center 100 may display content 131B and 131C from messages posted by different celebrities and journalists, respectively, over the same time periods associated with timelines 131A and 131E. Command center 100 also may display images 131D posted by different users over the same time periods.

Displaying these disparate data items together over a same relative timeline or time period allow a viewer to better correlate more objective metric data with more subjective social media content. For example, a user can not only view sales figures and web traffic 131A and 131E, respectively, for a particular product or event, but can also view the social commentary 131B-131D for the same product or event during that same time period. This allows the viewer to better understand customer objective and subjective responses to product, services, topics, and/or events.

For example, command center 100 may display the number of people attending an event in metric 131A and display content of messages 131B-131D posted by different users attending the event. A large number of attendees identified in metric 131A may initially indicate a successful event. However, the people attending the event may provide mixed reviews of the event in messages 131B-131D. Thus, command center 100 may provide financial, economic, or other objective metrics for the event, product, or service and also provide content that indicates the actual impressions and responses of attendees regarding the same event, product, or service.

A user may change the dimension 130 displayed by command center 100 simply by selecting different icons 154 displayed by a remote control application 156 operating on device 110. Remote control application 156 sends an input vector 135 to socket server 108 identifying the selected dimension 103. Socket server 108 sends input vector 135 to different display modules operating with applications on display devices 102, 104, and 106. Display modules 142 request analytics engine 114 to upload content or metrics associated with the new dimension 130. Display modules 142 then automatically display the associated content or metrics for a same synchronized time period.

Synchronizing metrics 131A and 131E with content 131B-131D allow an event operator to react to real-time social reviews. For example, a peak in graph 131E may indicate a significant event. The messages 131B-131D associated with the peak in graph 131E may identify a problem associated with the event. The event operator may send personnel to event locations to resolve the complaints regarding long waiting times or a poor sound system discussed in content 131B-131D. The event operator also may exploit positive content by posting associated messages 131B-131D on display devices 102, 104, and 106 or on a corporate website.

Figure 2:
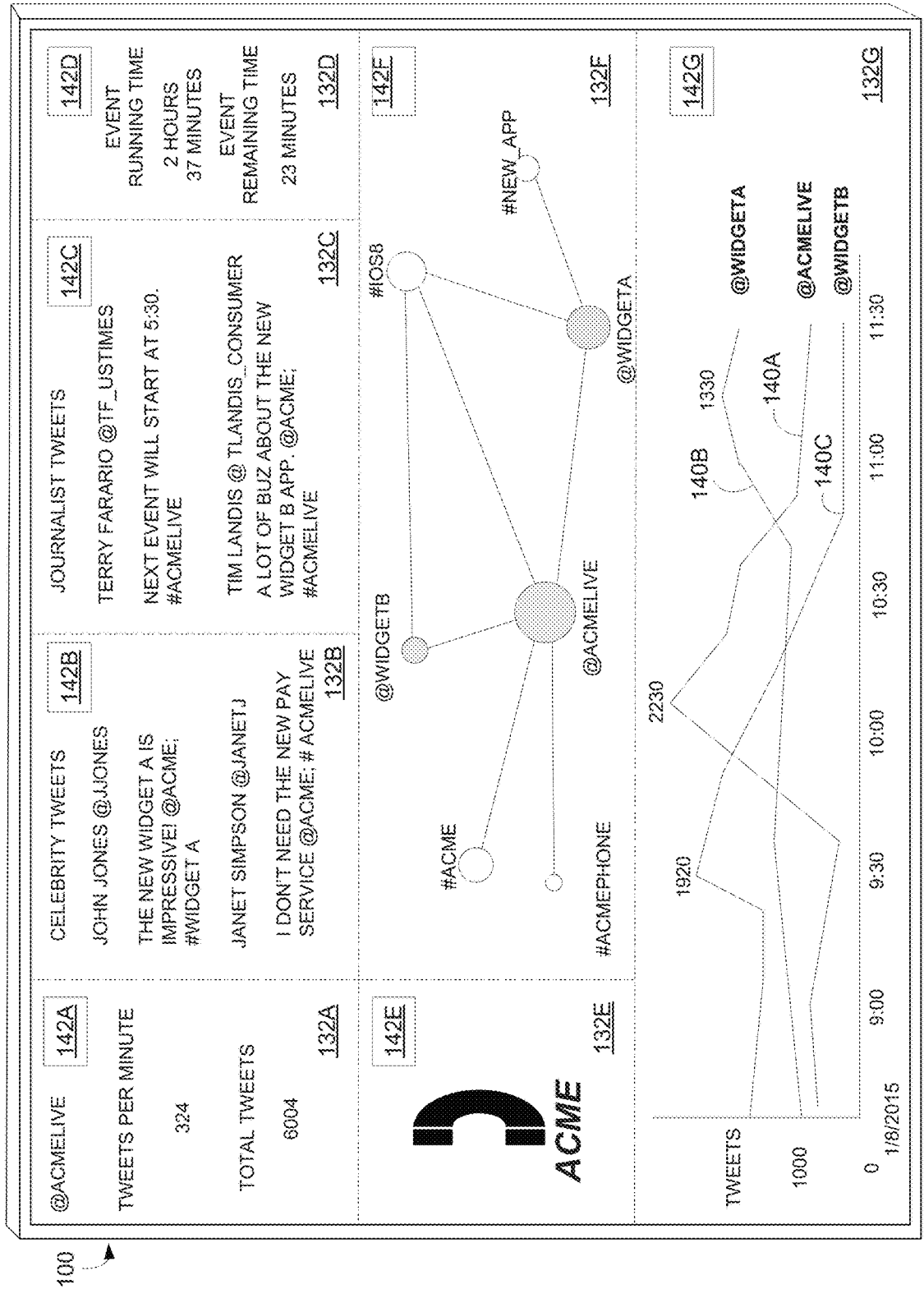
FIG. 2 depicts example content and metric data displayed by the command center.

FIG. 2 shows another example of data displayed by command center 100. In this example, a company Acme is hosting an event launching one or more products. The Acme company creates an account @acmelive on one or more websites. In addition, the Acme company may create accounts @widgetA and @widgetB and hashtags #widgetA and #widgetB for two new products widget A and widget B, respectively, being announced at the event. The Acme company may want to view in real-time different sales data and social media content associated with the event.

Referring to FIGS. 1 and 2, an employee from Acme company may enter a list of dimensions 130 into computer 122 that includes Acme, acmelive, widgetA, and widgetB. Management server 120 may generate a set of search terms that search data sources 112 for data associated with dimensions 130. For example, command center 100 may identify messages, tweets, comments, hashtags, images, likes, posts, etc. containing, referring to, or associated with the search terms Acme, acmelive, widgetA, and widgetB.

A function of the management server is to choose an appropriate query based on the dimension name for the third party data source. For instance, if the dimension name was "Widget A", management server 120 might try and find analytic data on all posts on connected social networks that mention "Widget" and "A" while at the same time find analytic data on all posts with the hashtag "#WidgetA" with no additional input or instruction from the user other than typing in the name "Widget A".

Command center 100 then generates content and metrics 132 for the identified data and displays content and metrics 132 on display devices 102, 104, and 106. Command center 100 may initially display the content and metrics associated with the acmelive event. For example, in FIG. 2 the analytics engine 114 may identify in metric 132A the total number of Twitter® messages (tweets) generated from the @acmelive account or referring to the @acmelive account and the number of those Twitter® messages generated per minute.

Command center 100 in FIG. 2 may display content 132B from some of the messages generated by celebrities attending the event. For example, analytics engine 114 may identify any users with a particular influence score or number of followers above some threshold level as a celebrity. Command center 100 also may store a predetermined list of celebrities. Command center 100 may display messages 132B generated by any of the identified celebrities that refer to the @acmelive account or are generated from the @acmelive account.

Analytics engine 114 also may display journalist messages 132C. For example, command center 100 may display messages generated from particular publisher accounts that refer to the @acmelive event or are generated from the @acmelive account. Command center 100 also may store a white list of journalist accounts and display messages from the list that refer to the @acmelive event. In another example, command center 100 may display random messages sent from the general public.

Command center 100 may display a running time and remaining time 132D for the acmelive event. Command center 100 also may extract and display an image 132E from the acmelive account, such as a company logo. For example, command center 100 may copy an image displayed in the @acmelive webpage.

Analytics engine 114 in FIG. 2 also may generate a topic graph 132F linking different terms used in the acmelive messages. For example, analytics engine 114 may generate graph 132F from the list of topics @acmelive, @widgetA, and @widgetB provided by the Acme company employee. Analytics engine 114 may generate a circle with a diameter proportional to the total number of messages associated with @acmelive. Analytics engine 114 then may generate other circles with diameters proportion to the number of @acmelive messages that include terms @widgetA and @widgetB.

Command center 100 may identify any other topics in topic graph 132F associated with @acmelive either based on the topic list received via computer 122 or adhoc. For example, analytics engine 114 may identify the other most frequently used terms, labels, hashtags, etc. in the @acmelive messages and possibly in the @widgetA and @widgetB messages. Analytics engine 114 then generates circles in graph 132F with diameters proportional to the number of adhoc messages that include the terms and creates links that indicate which messages contained the terms.

For example, topic graph 132F indicates that a first number of @acmelive messages included the term #acme, a second number of @acmelive messages included the term #acmephone, and a third number of @acmelive messages included the term #IOS8. Topic graph 132F also indicates a number of @widgetA and @widgetB messages also included the term #IOS8.

Command center 100 allows the viewer to search further into identified terms. For example, the viewer may discover a relatively large number of @acmelive messages include the term #IOS8. The viewer may enter the term IOS8 into remote control application 156 in FIG. 1 or may simply click on the circle in topic graph 132F associated with #IOS8. Command center 100 then may conduct a new search that identifies and generates content and metrics 132 associated specifically with the #IOS8 dimension. The newly generated content and metrics may provide further insight on what customers at the event are thinking and saying about #IOS8.

Analytic engine 114 in FIG. 2 also may generate different timelines 132G that identify the number of messages generated over the same relative time periods for different topics. For example, a first graph 140A may identify the number of @acmelive messages generated over different 30 minute time periods. A second graph 140B may identify the number of @widgetA messages generated during the same 30 minute time periods, and a third graph 140C may identify the number of @widgetB messages generated during the same 30 minute time periods.

Timelines 132G may reflect the popularity for different portions of an event or different products announced during the acmelive event. For example, a peak in graph 140B may correspond to the announcement of widgetA during the acmelive event and a peak in graph 140C may correspond with the announcement of widgetB during the acmelive event. The larger number of messages associated with graph 140C may indicate consumers are more interested in, or like, widgetB more than widgetA. In another example, a peak in graph 140A also may indicate a problem or other relatively significant event during the acmelive event.

The application operating on display device 104 may include separate display modules 142A-142G that each display different content or metrics 132 for the selected dimension. For example, display module 142A may be responsible for displaying the number of Twitter® messages sent per minute and total Twitter® messages 132A associated with the @acmelive event. Display module 142B may be responsible for displaying the contents of celebrity Twitter® messages 132B.

Display modules 142 automatically synchronize content and metrics 132 for the selected dimension over a same relative time period. For example, display module 142G displays timelines 132G identifying the number of Twitter® messages generated for the @acmelive event for 30 minute time periods on the day of the @acmelive event. Display module 142C displays the content of journalist Twitter® messages 132C for the same time periods during the same day. For example, display module 142C may continuously display and update journalist messages 132C for each thirty minute time period on the day of the @acmelive event.

Figure 3:
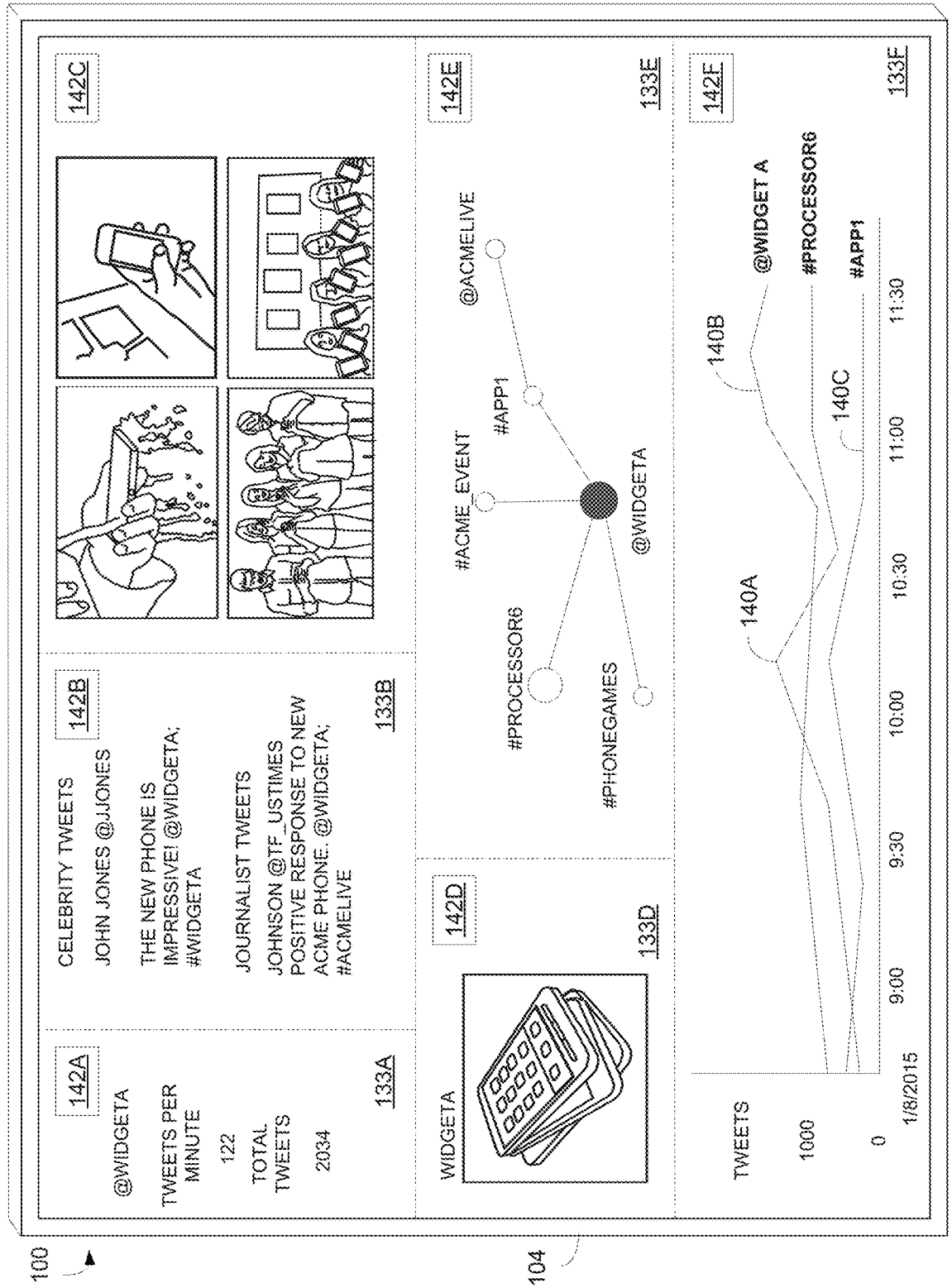
FIG. 3 depicts another example of different content and metrics displayed by the command center.

FIG. 3 shows another example of data displayed by the command center. Referring to FIGS. 1 and 3, a user may select a different dimension via remote control application 156 for displaying on display devices 102, 104, and 106. For example, the user may select the dimension or topic widgetA via selection of one of icons 154 displayed on device 110. In response to selecting icon 154, command center 100 generates and displays content and metrics 133 associated with widgetA.

For example, display modules 142 receive a new input vector 135 from socket server 108 identifying the new widgetA dimension. Each display module 142 then requests new data from analytics engine 114 for widgetA. For example, display module 142A may send a request to analytics engine 114 for the number of Twitter® messages associated with @widgetA. Separately, display module 142B may send a request to analytics engine 114 for celebrity messages associated with @widgetA.

In response to the request sent by display module 142A, analytics engine 114 may calculate the number of messages generated per minute and total generated messages 133A associated with @widgetA. In response to the request from display module 142B, analytics engine 114 also may identify content in celebrity messages 133B that refer to @widgetA.

In FIG. 3, command center 100 also identifies and displays images 133C from messages associated with @widgetA. For example, per a request from display module 142C, analytics engine 114 may extract images 133C from Instagram® messages that are generated from the @widgetA account or refer to @widgetA.

Command center 100 also displays a new image 133D representing widgetA. For example, per a request from display module 142D, analytics engine 114 may extract an image displayed on the web page of the @widgetA account. Display module 142D also may change the background color on display device 104 either to a color corresponding to the home web page for the @widgetA account or change the background color on display device 104 to any other color different from the background color previously used in FIG. 2. The change in background color on display device 104 and displaying image 133D provides a visual indication that the information on display device 104 has changed and is now associated with a different widgetA dimension.

In response to a request from display module 142E, analytics engine 114 generates a new topic graph 133E that now identifies the topics, hashtags, labels, etc. most frequently used in the messages associated with @widgetA. For example, topic graph 133E indicates that #processor6 is one of the most frequently used terms in the @widgetA messages.

In response to a request from display module 142F, analytics engine 114 also generates a new set of timelines 133F associated with @widgetA. For example, graph 140B may be the same graph previously shown in FIG. 2 showing the number of messages generated for @widgetA. However, graphs 140A and 140C now show changes in the number of messages for other topics specifically associated with @widgetA. For example, graph 140A may show the number of messages associated with a processor6 used in widget and graph 140C may show the number of messages associated with a software application running on widgetA.

Analytics engine 114 and display modules 142 generate and display content and metrics 133 for widgetA adhoc and in substantially real-time based on input vectors 135 received from remote control application 156 operating on device 110. The different display modules 142D automatically synchronize content and metrics 133 for the new selected widgetA dimension over the same relative time periods. For example, either via a time value included in input vector 135 or based on a preconfigured time period, each of display modules 142 will display the associated content or metric 133 for a same relative time period. For example, each display module 142 may display the associated content or metrics for the same corresponding 30 minute time periods over a current day.

Thus, a user can navigate through different dimensions associated with events, products, services, topics, etc. simply by selecting different icons displayed on device 110 in FIG. 1. All of the different content and metrics associated with the selected dimension is then automatically synchronized to the same relative time period. This navigation capability allows the viewer to better monitor, analyze, and correlate different data for different topics.

Figure 4:
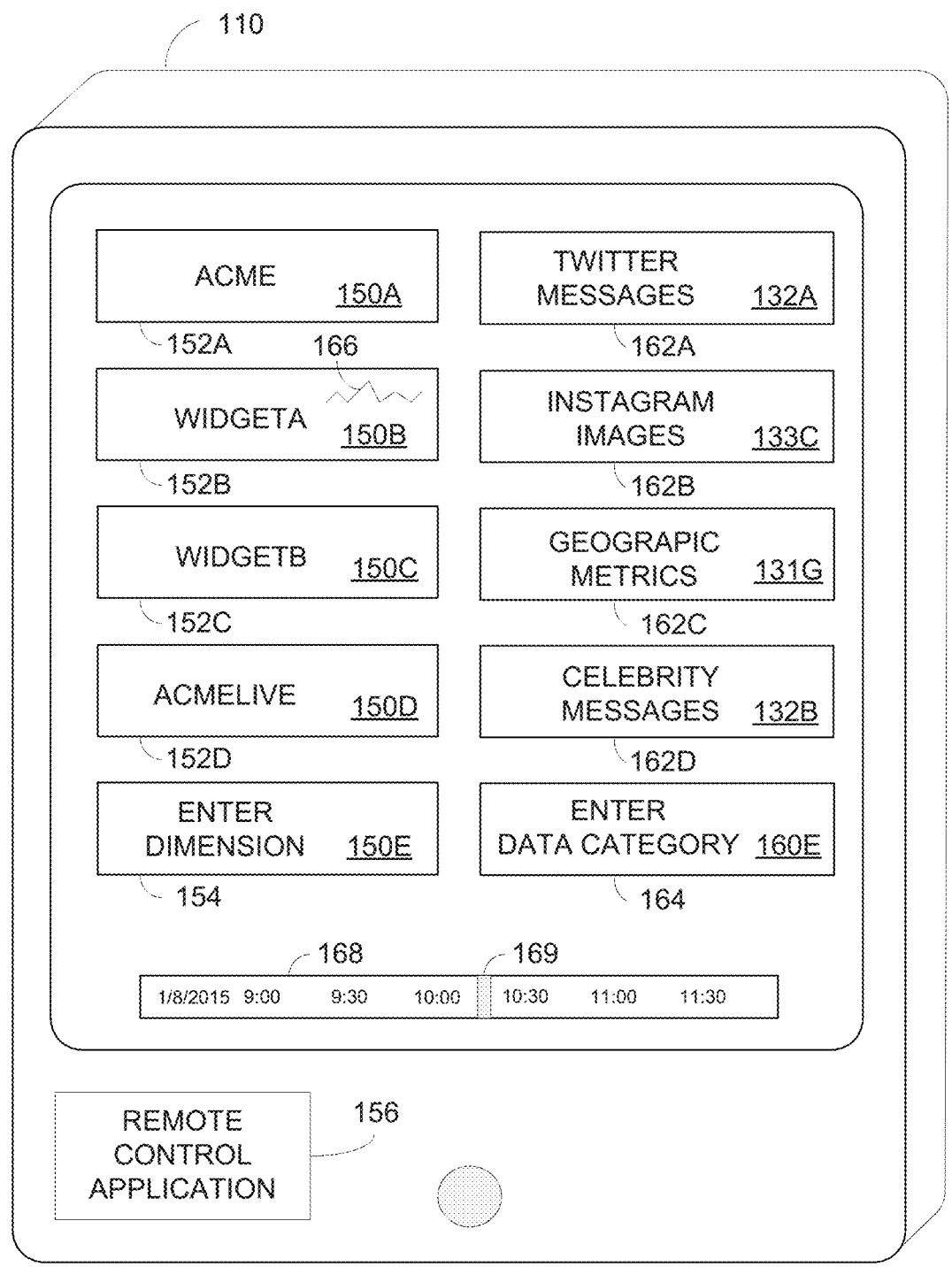
FIG. 4 depicts example remote control application used to control what data is displayed by the command center.

FIG. 4 shows remote control application 156 operating on device 110 in more detail. As described above, an operator may provide a list of dimensions 150 associated with a particular entity, event, or topic. In this example, a top level dimension 150A may be associated with the Acme company. Sub-dimensions 150B-150D may include products, services, topics and/or events associated with the Acme company, such as widgetA, widgetB, and acmelive, respectively.

Referring to FIGS. 1 and 4, device 110 may comprise a smart phone, tablet, watch, laptop, or any other portable computing device that operates remote control application 156. Application 156 displays a set of icons 152A-152D associated with dimensions 150A-150D, respectively. The viewer may select any of icons 152A-152D to view the content and metrics associated with dimensions 150A-150D, respectively. For example, as shown above, the operator may change from viewing content and metrics associated with the acmelive event 150D in FIG. 2 to viewing content and metrics associated with widgetA 150B in FIG. 3 simply by selecting icon 152B.

Remote control application 156 also may display a field 154 for entering other dimensions that are not currently displayed. For example, a user may enter any dimension, brand, account, hashtag, label, or topic 150E into field 154. Application 156 may send dimension 150E to management server 120, analytics engine 114, and display modules 142 in FIG. 2. Management server 120 may cause collection server 116 and analytics engine 114 to connect and download data from multiple data sources 112 associated with dimension 150E. Analytics engine 114 may generate metrics from the data and display modules 142 operating in applications on display devices 102, 104, and 106 may display the content and metrics.

Remote control application 156 also may display icons 162 associated with different content and metrics. For example, application 156 may display an icon 162A associated with Twitter® messages 132A, display an icon 162B associated with Instagram® messages 133C, display an icon 162C associated with geographic data 132E, and display an icon 162D associated with celebrity messages 132B. A user may change the content or metrics generated and displayed on display devices 102, 104, and 106 by selecting associated icons 162.

Display modules 142 in FIGS. 2 and 3 may initially display a group of content and metrics 132 as shown in FIG. 2. The user may change the types of content and metrics displayed by display modules 142 in FIG. 2 by selecting different icons 162 in FIG. 4. For example, the user may cause display module 142C to change from showing journalist messages 132C in FIG. 2 to displaying images 133C from Instagram® messages in FIG. 3 by selecting icon 162B in FIG. 4.

Similarly, the user may cause display module 132F to change from displaying topic graph 132F in FIG. 2 to displaying location map 131G in FIG. 1 by selecting icon 162C in FIG. 4. An icon 164 allows the user to enter any other data category, content, metric, etc. that is not currently associated with one of icons 162. Icons 162 also may include screen location identifiers (not shown) that indicate where to locate the associated content or metric within the display devices.

In one example, the application operating on at least one of display devices 102, 104, and/or 106 in FIG. 1 also may display the same icons 152 and/or 162 and fields 154 and 164 displayed on device 110. The user may touch the screen of the display device or touch the screen of device 110 to then select any of the icons 152 or 162, or enter values into fields 154 or 164.

In another example, remote control application 156 in FIG. 4 may display a portion of the associated content or metric within icons 152 or 162. For example, remote control application 156 may display a sparkline 166 within icon 152B that corresponds with the number to Twitter® messages for graph 140B in FIG. 2. A spike in sparkline 166 may provide a visual indication of event associated with widgetA.

Remote control application 156 may generate a notification identifying the event in sparkline 166. For example, analytics engine 114 may detect a volume of messages above a normal threshold. Analytics engine 114 then may push a notification message to application 156 indicating the number of Twitter® messages associated with widgetA has reached an all-time high. Application 156 then displays the message on device 110.

Remote control application 156 also may display a timeline 168. A user may move a scroll bar 169 to select different time periods for the content and metrics displayed by the display modules 142. Application 156 sends the time value selected by scroll bar 169 as part of input vector 135 in FIG. 1. The display modules in the display devices 102, 104, and 106 then display their associated content or metrics for the selected time value.

Thus, command center 100 creates adhoc multidimensional searches for data contained in different data sources. Command center 100 without any additional programming then generates and displays synchronized content and metrics for other selected dimensions enabling users to visually compare different types of data and then navigate through other dimensions and associated content and metrics simply by selecting different items from the remote control application 156.

Figure 5:
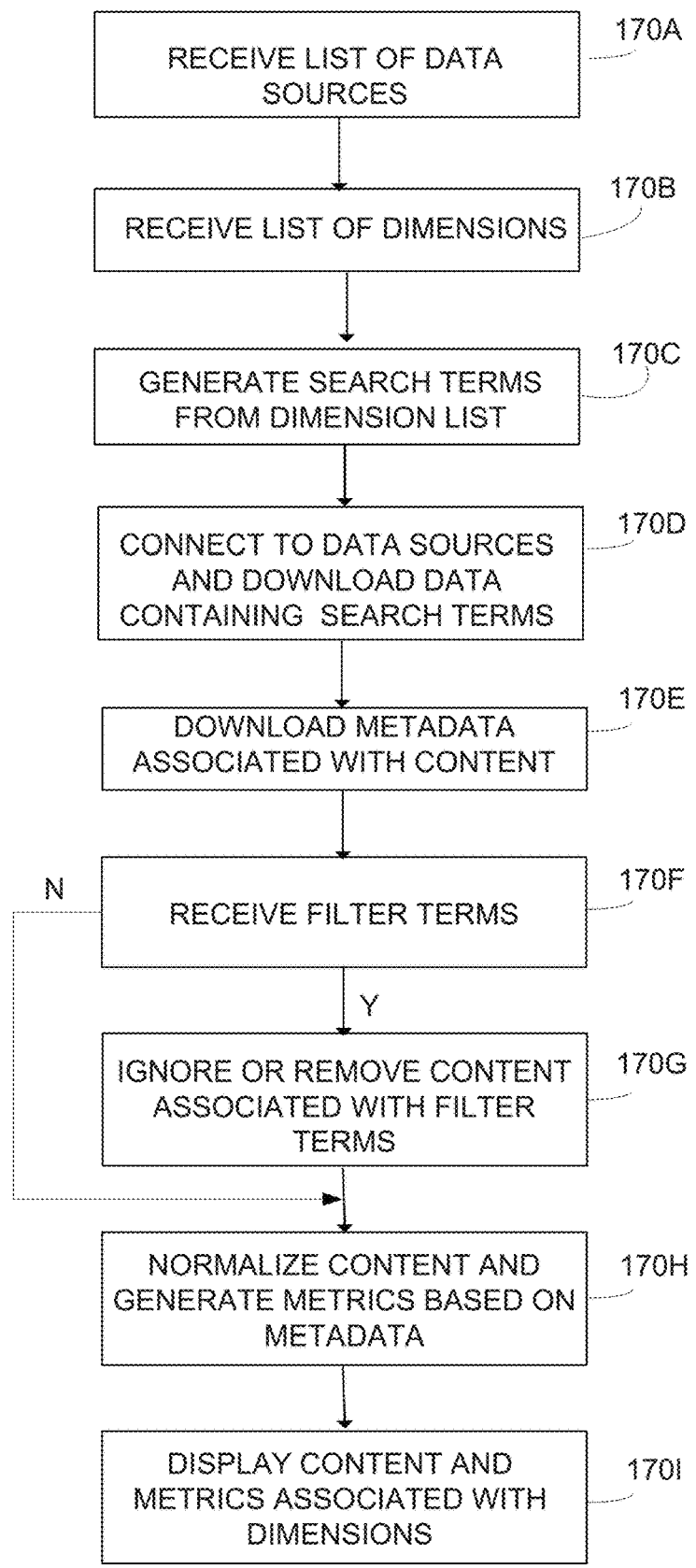
FIG. 5 depicts an example command center process for displaying data.

FIG. 5 depicts an example process for generating content and metrics. Referring to FIGS. 1 and 5, command center 100 in operation 170A receives a list of data sources. For example, an operator may enter a list via computer 122 that includes links to different social network websites, company websites, third party websites, and other data, such as spreadsheets, inventory databases, sales databases, reports, etc.

In operation 170B, command center 100 receives a list of dimensions via computer 122 or remote control device 110. As explained above, the list of dimensions may include any combination of products, events, services, topics, labels, etc. that a user wishes to monitor. In operation 170C, command center 100 generates a list of search terms associated with the list of dimensions. For example, command center 100 may convert the word ACME into search terms, such as acme, @acme and #acme.

In operation 170D, command center 100 connects to the different data sources and searches for data associated with the search terms. For example, command center 100 uses APIs 124 and 126 for the different data sources 112A and 112B, respectively, to download data associated with the search terms. For example, collection server 116 may search an ACME account on a Twitter® website, a Facebook® website, and an Instagram® website. Collection server 116 also may search a WWW.acme.com website.

Collection server 116 downloads data 114 from the different data sources 112B into database 118, such as content and associated metrics for messages, posts, images, etc. Analytics engine 114 also may download real-time streaming data 128 from data sources 112A.

The user may enter different dimensions associated with a corporate product hierarchy into computer 122 or command center 100 may determine the dimensions based on a URL hierarchy. For example, a user may enter the dimension ACME into computer 122. Collection server 116 may identify a first acme directory or acme web page in data sources 112 with the most volume as a root dimension and identify a widgetA sub-directory or sub-web page with a second largest amount of volume as a first sub-level dimension of the acme directory or web page.

Collection server 116 also may search for the closest string matches for widgetA, widgetB, and acmelive below the www.acme.com web page as www.acme.com/widgetA, www.acme.com/widgetB, and www.acme.com/acmelive. Collection server 116 may assume that every web page below a root web page is associated with the same root web page. For example, analytics engine 114 may count all user visits and messages to web page www.acme.com/widgetA and all visits to web pages below www.acme.com/widgetA as associated with widgetA.

In operation 170E, collection server 116 captures metadata associated with the dimension data. For example, command center 100 may identify time stamps and geographic data associated with the dimension and/or identify any other profile information associated with the user that accessed the web page or posted the message associated with the dimension.

In operation 170F, command center 100 may receive filter terms. For example, command center 100 may extract data from different data sources that are unrelated to the dimension. For example, a user may enter the dimension @acme for an account operated by a company that makes smart phones. However, command center 100 may identify additional data related to a @acme1 account operated by a company that sells shoes. Command center 100 may display the two terms @acme and @acme1 to the user and the user then may select terms for filtering, such as @acme1. In operation 170G, collection server 116 and/or analytics engine 114 either does not download the data associated with @acme1 or deletes downloaded data associated with @acme1.

In operation 170H, the downloaded data is normalized based on the associated metadata. For example, the metadata may include timestamps. Command center 100 may download different data from different data sources and generate different metrics for the different data based on the time stamps. For example, sales data from a first data source may include times and dates of sales for widgetA. Twitter® messages related to widgetA from a second Twitter® website may include times when messages were sent by users.

Command center 100 may accumulate data from the first and second data source for 30 minute time periods over the same day or week. Analytics engine 114 then generates a first graph showing the number of sales of widgetA for each 30 minute time period during a given day. Analytics engine 114 generates a second graph that shows the number of Twitter® messages associated with widgetA and content for some of the Twitter® messages for each 30 minute time period during that same day. Thus, both the sales figures and Twitter® messages are normalized over the same time periods. This normalization provides more intuitive visual correlation between the objective sales data and the more subjective social media content.

In operation 170I, the display modules display the content and metrics associated with the selected dimensions. Real-time content and metrics may be combined from data previously collected and accumulated over previous time periods. For example, analytics engine 114 may continuously receive the latest real-time streaming data 128 associated with a particular dimension. Analytics engine 114 may continuously accumulate and combine the real-time data with the previously accumulated data contained in database 118. The latest content associated with the dimension may be displayed and the associated metrics readjusted on display devices 102, 104, and 106.

Figure 6:
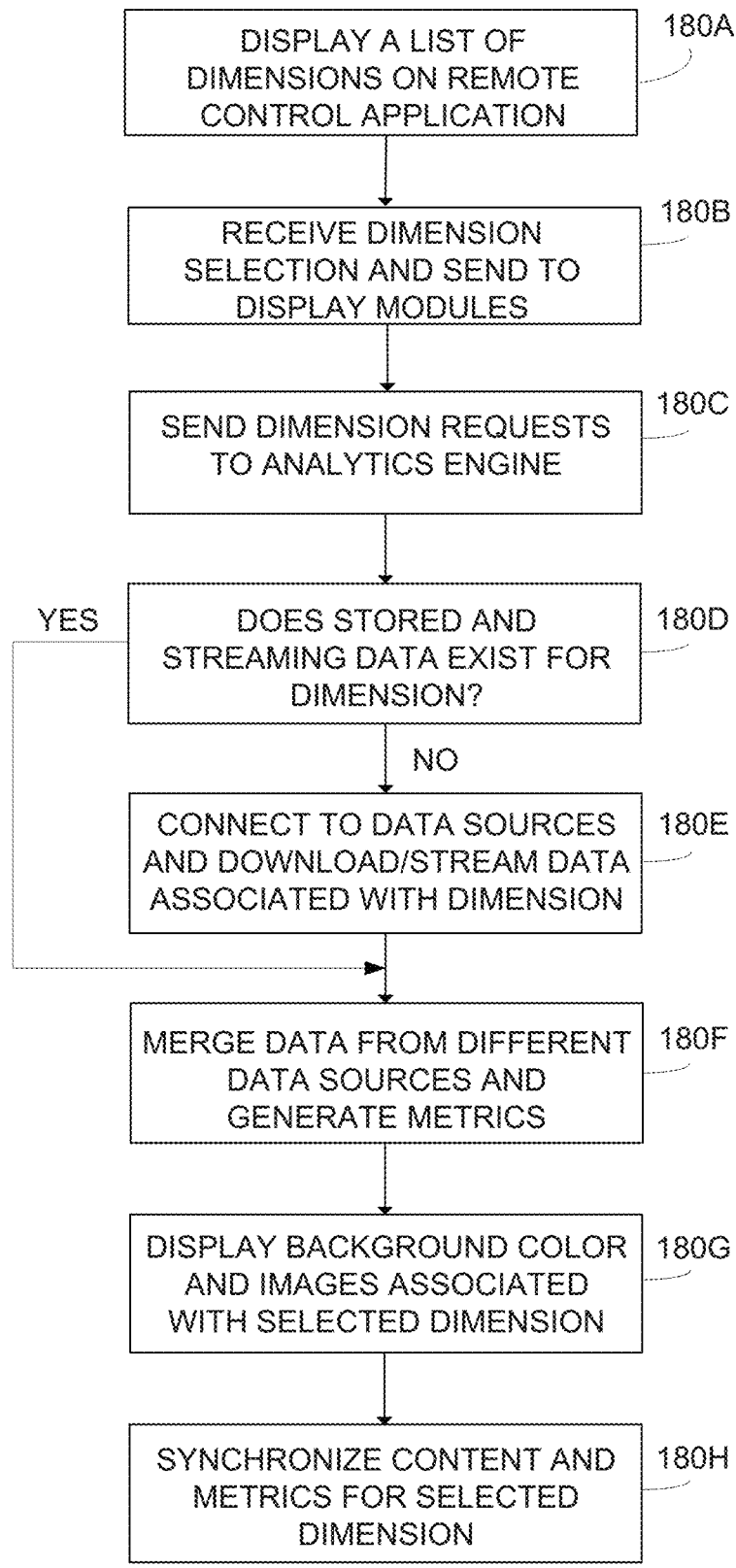
FIG. 6 depicts an example command center process for changing dimensions.

FIG. 6 shows an example process for varying the content and metrics currently displayed by the command center. Referring to FIGS. 1 and 6, remote control application 156 on device 110 in operation 180A displays different dimensions, content, and/or metrics. In operation 180B, application 156 detects a selection of an icon associated with a dimension, content, and/or metric that is not currently displayed on display devices 102, 104, or 106. Application 156 sends an input vector to socket server 108 in FIG. 1 and the socket server sends the input vector to the display modules operating in the display devices.

In operation 180C, the display modules send requests to the analytics engine for data associated with the selected dimension. For example, a first display module may ask the analytics engine to generate a graph displaying the number of Twitter® messages generated each 30 minutes for the selected dimension. A second display module may ask the analytics engine to provide images from Instagram® messages sent over the last 30 minutes for the selected dimension. As mentioned above, the user may select a specific time period for the dimension using timeline 168 in FIG. 4.

In operation 180D, display modules 142 and/or analytics engine 114 determine if data for the selected dimension and time period are currently being streamed and/or stored from data sources 112. If not, command center 100 connects to data sources 112 and searches for data associated with the selected dimension.

In operation 180F, analytics engine 114 merges the data from the different data sources 112 associated with the selected dimension. For example, analytics engine 114 merges real-time streaming data 128 with the data downloaded into database 118. Merging real-time data 128 with stored data 114 allows analytics engine 114 and display modules 142 to generate, display, and continuously update content and metrics associated with the selected dimension.

In operation 180G, one of the display modules 142 may display a background color and/or image associated with the selected dimension. For example, one of display modules 142 may identify a color and/or image displayed on a top web page associated the selected dimension and display the color and image on display devices 102, 104, and 106. The display module may change the background color or font on the display devices to indicate content and metrics are now being displayed for a new dimension.

In operation 180H, different display modules 142 display synchronized content and metrics for the selected dimension, time period, location, etc. The displayed content and metrics may depend on the data provided by the data sources. For example, a data source such as Google® analytics may identify the number of user visits, time on page, etc. for each web page. A data source such as Salesforce.com® may contain reports for sales figures, inventory, etc. Display modules 142 may display metrics for the user visits provided Google® analytics and display metrics for the sales figures provided by the Salesforce.com® reports. As explained above, the display modules display content and data for the same synchronized time periods.

Figure 7:
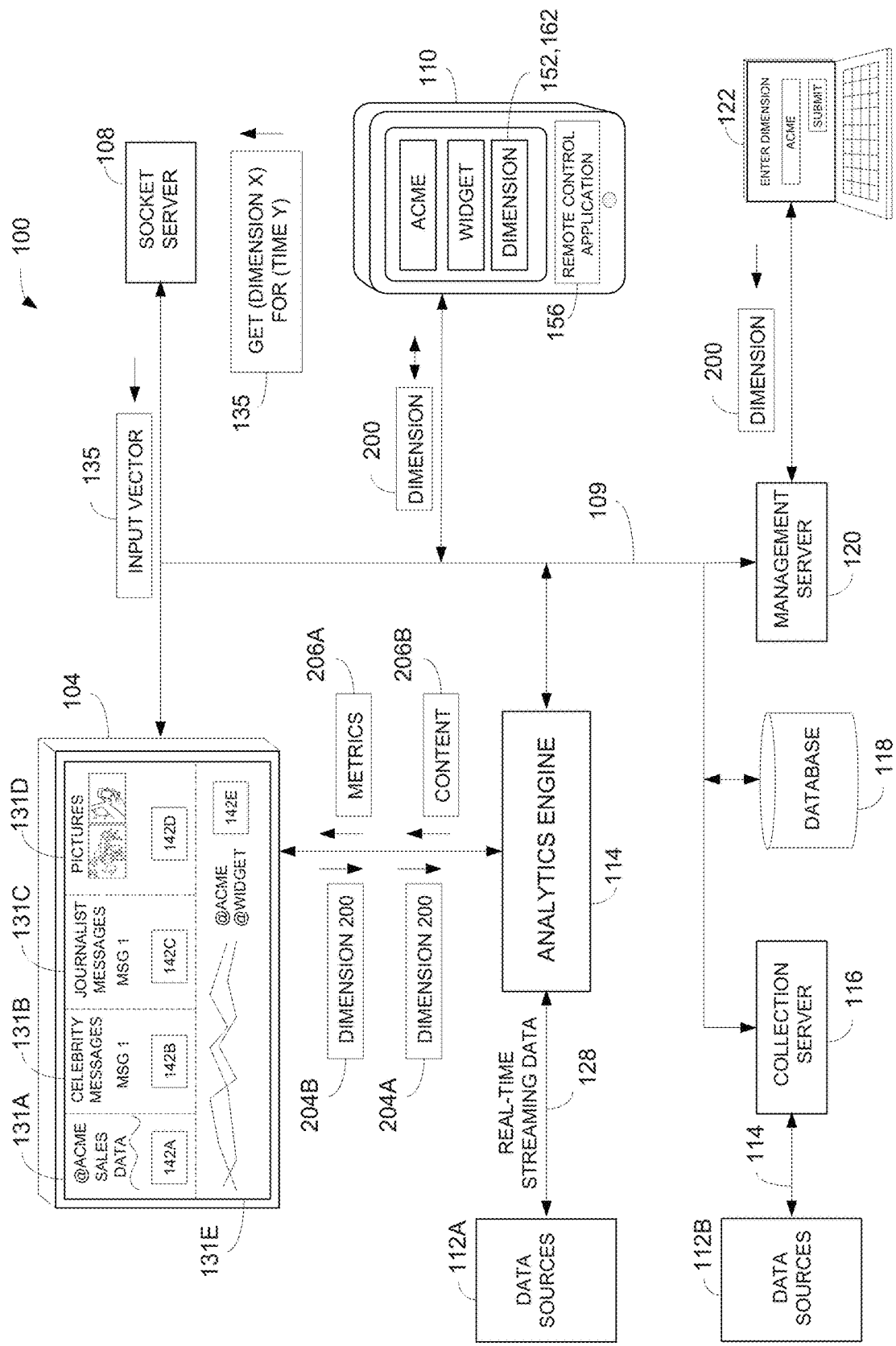
FIG. 7 depicts an example process for exchanging input vectors between different applications operating in the command center.

FIG. 7 shows how messages are exchanged between different applications in command center 100. The applications running on the devices in command center 100 operate as a real-time multi-dimensional search engine that synchronizes together different content and metrics for selected dimensions. In one example, messages and data are exchanged between the different applications operating in command center 100 via an Internet network 109. Of course, command center 100 may use any combination of wide area networks (WANs), local area network (LANs), wireless cellular networks, or WiFi networks 109.

Devices 104, 108, 110 114, 116, 120, and 122 may operate separate applications that are all part of a single universal resource locator (URL). If loaded on display device 104 or display device 106, the URL operates a set of display modules that display content and metrics 131. If loaded on device 110, the URL transitions into remote control application 156 described above in FIG. 4.

As explained above, remote control application 156 uses socket server 108 to control display modules 142 operating in display device 104. Socket server 108 allows browser sessions operating on the different command center devices to talk to each other and transfer data. Socket server 108 also allows remote control application 156 to send asynchronous input vectors 135 to display modules 142 without display modules 142 constantly polling application 156 for a current list of selected dimensions.

A user enters one or more dimensions 200 into computer 122 or enters one or more dimensions 200 into remote control application 156. Computer 122 may forward any received dimensions 200 to management server 120 and to remote control application 156. Remote control application 156 may display dimensions 200 received from computer 122 as icons 152 or 162. Remote control application 156 may send an input vector 135 that identifies dimensions 200 both to management server 120 and to socket server 108.

Management server 120 maintains a list of all available dimensions and determines if the selected dimensions 200 are contained in database 118. If not, management server 120 may direct collection server 116 and/or analytics engine 114 to connect to data sources 112 and search for data associated with dimensions 200.

Socket server 108 sends input vector 135 to display modules 142 that identify dimensions 200 selected via application 156. Display modules 142 then send messages 204 to analytics engine 114 requesting data associated with dimensions 200. For example, display module 142A may send a message 204A requesting sales data associated with dimension 200 and display module 142B may send a message 204B requesting celebrity Twitter® messages associated with dimension 200.

Analytics engine 114 provides data 206 back to display modules 142 containing the content and metrics available for dimension 200. For example, analytics engine 114 may send metrics 206A back to display module 142A identifying the number of sales associated with dimension 200 for the last 24 hours. Analytics engine 114 may send content 206B back to display module 142B comprising celebrity Twitter® messages associated with dimension 200.

Display modules 142 continue to ask for new data from analytics engine 114 and coordinate how the new data is displayed and merged with other data. For example, display modules 142 determine what content and metrics are displayed on the display device and how updates to the content and metrics are integrated with previously displayed data. If additional data is needed, display modules 142 may direct analytics engine 114 and/or collection server 116 to download additional data associated with dimensions 200.

Another socket server (not shown) may be connected between data sources 112A and analytics engine 114. Analytics engine 114 may not only warehouse data or pass data through to display modules 142, but may combine the data from the different data sources 112 together into a hybrid set of content and metrics. Analytics engine 114 and display modules 142 also provide real-time updates to the content and metrics displayed on display device 104. Some information loses value after a short amount of time. Therefore, the real-time streaming by analytics engine 114 and display modules 142 allow a user to identify trending topics and select, search, and generate more up to the minute content and metrics associated with those topics.

Analytics engine 114 also may archive data for playback. For example, computer 122 may display a timeline or application 156 may display timeline 168 in FIG. 4. The user may choose other time dimension ranges or even scroll a timeline to display data associated with specific points in time within a larger time period. Analytics engine 114 may store data for different selected and non-selected dimensions in database 118. The user may replay the stored data for any event or dimension regardless if the event or dimension was ever previously selected by the user.

In summary, remote control application 156 generates input vectors 135 that may include dimension 200 and/or a time values. Socket server 108 sends the input vectors 135 to each of the different display modules 142. Display modules 142 then separately communicate with analytics engine 114 requesting different content or metrics 131. Display modules 142 then display the associated content or metric for the same synchronized time periods on display device 104.

Input vectors 135 in combination with control display modules 142 allow command center 100 to automatically display synchronized content and metrics for any selectable dimension on any display canvas configuration. For example, one command center 100 as shown in FIG. 1 may include multiple display devices 102, 104, and 106. A command center administrator simply configures different display modules 142 to different locations within the different display devices 102, 104, and 106. Display modules 142 operating on the different display devices 102, 104, and 105 then automatically take over responsibility for displaying the associated content or metric 131 for any received dimension received via input vector 135.

Command center 100 may display a set of selectable display modules 142. A user may select display modules 142 for displaying different types of data on display device 104. For example, display device 104 may display a set of display modules 142 in a toolbar and the user may drag and drop different display modules 142 into different locations in display device 104. In another example, computer 122 and/or remote control device 110 may display the display modules in a tool bar and drag and drop display modules 142 into different locations of a virtual image of the display device 104. The selected display modules 142 then take over displaying associated types of data in the selected locations of display device 104.

Dynamic Topic Correlation

Figure 8:
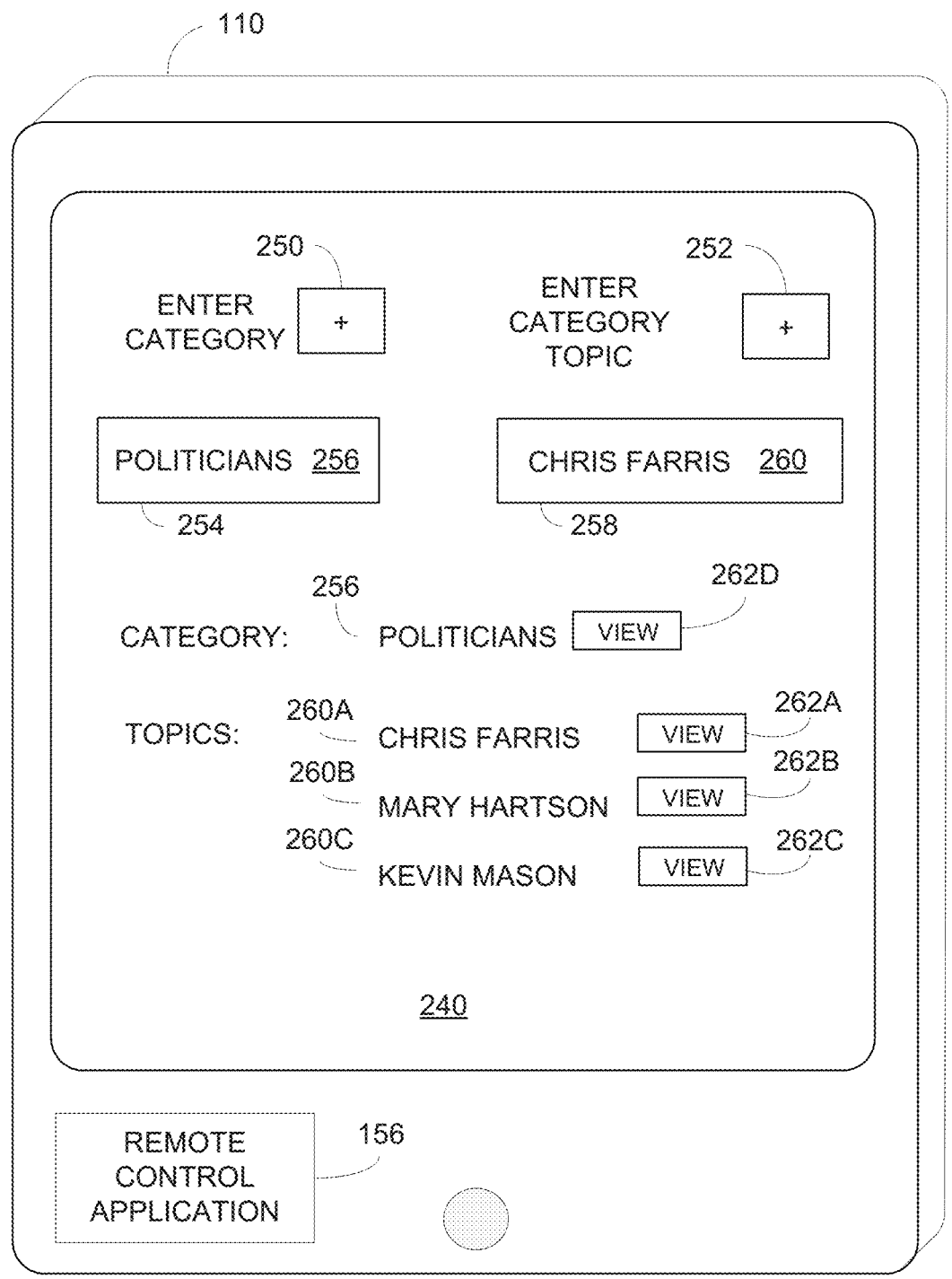
FIG. 8 depicts another example remote control device.

FIG. 8 displays remote control device 110 in more detail. As mentioned above, a dimension may include any topic, segment, data category, gender, geography, time, content, metric, product, service, event, label, hashtag, gender, geography, time, content, metric, etc. The example below uses the term topic interchangeably with dimension.

Referring to FIGS. 7 and 8, remote control application 156 may provide a user interface 240 for dynamically selecting and displaying different categories 256 and/or different topics 260. In response to selecting icon 250, remote control application 156 may display a field 254 for entering a category 256. In response to selecting icon 252, remote control application 156 may display a field 258 for entering a topic 260. Category 256 and topic 260 may include any subject that the user would like to view on display device 104.

In this example, the user creates a politicians category and creates topics under the politicians category for different political candidates. The user may enter the word "politicians" into field 254 as category 256. However, the user may enter any word, phrase, term, etc. into field 254 and create any number of categories 256. In this example, the user enters the word "Chris Farris" into field 258 as a candidate topic 260 underneath politicians category 256. The user also may enter any word, phrase, term, etc. into field 258 and create any number of topics 260 for category 256. For example, the user may enter other candidate topics 260 into field 258, such as Mary Hartson and Kevin Mason. Remote control application 156 may save categories 256 and associated topics 260 in memory.

Remote control application 156 may display categories 256 and associated topics 260 in response the user selecting other icons in user interface 240. For example, remote control application 156 may display all of the categories previously entered by the user on a first screen of user interface 240. In response to selecting politicians category 256, remote control application 156 may display the associated politicians topics 260A-260C for Chris Farris, Mary Hartson, and Kevin Mason, respectively.

The user may enter other categories 256 or topics 260 into remote control device 110. Command center 100 then may identify any related topics. For example, the use may enter a category for sports into remote control device 110 and command center 100 may identify different related topics, such as hockey, basketball, football, and baseball.

Command center 100 may search different data sources 112 for data associated with the three topics 260A-260C entered by the user for politicians category 256. In another example, command center 100 may dynamically identify topics 260. For example, the user may not enter any topics 260 for politicians category 256, or the user may only enter a few topics 260. Command center 100 may automatically identify additional topics 260 for politicians category 256 and display the identified topics 260 on user interface 240. Automatically generating topics 260 is described in more detail below in FIG. 9.

Remote control application 156 may display view icons 262 next to category 256 and associated topics 260. Remote control application 156 may cause command center 100 to search for data related to topics 260 or generally to category 256 in response to selecting view icons 262A-262D. For example, command center 100 may search for data related to politicians category 256 in response to a user selecting view icon 262D. In another example, command center 100 may search different data sources 112 for data associated with Chris Farris topic 260A in response to a user selecting view icon 262A.

Command center 100 may start searching data sources 112 as soon as the user enters a category 256 and/or topic 260 into remote control device 110. Otherwise, command center 100 may search for data associated with selected categories 256 and/or topics 260 and display the data on display devices 104 in response to the user selecting view icons 262.

In another example, remote control device 110 and/or computer 122 may include voice recognition software. The user may utter voice commands into remote control device 110 and/or computer 122 to create and view categories 256 and/or topics 260. For example, the user may speak into a microphone on remote control device 110 and give the oral command "create topic." Remote control application 156 may display field 258 in response to the voice command. Remote control application 156 may create topic 260A in response to the user then uttering the voice command "Chris Farris." Remote control application 156 may display data related to topic 260A in response to the user then uttering a voice command, such as "view topic Chris Farris."

Remote control application 156 also may change topics and display data associated with the new topics in response to voice commands. For example, command center 100 may currently display data for Chris Farris and also display a metric showing the number of messages posted over the day for Chris Farris, Mary Hartson, and Kevin Mason. The user may utter the voice command "view topic Kevin Mason" into remote control device 110. Remote control application 156 sends the new topic "Kevin Mason" to command center 100 and command center 100 then searches and displays data for "Kevin Mason" on display device 104.

Figure 9:
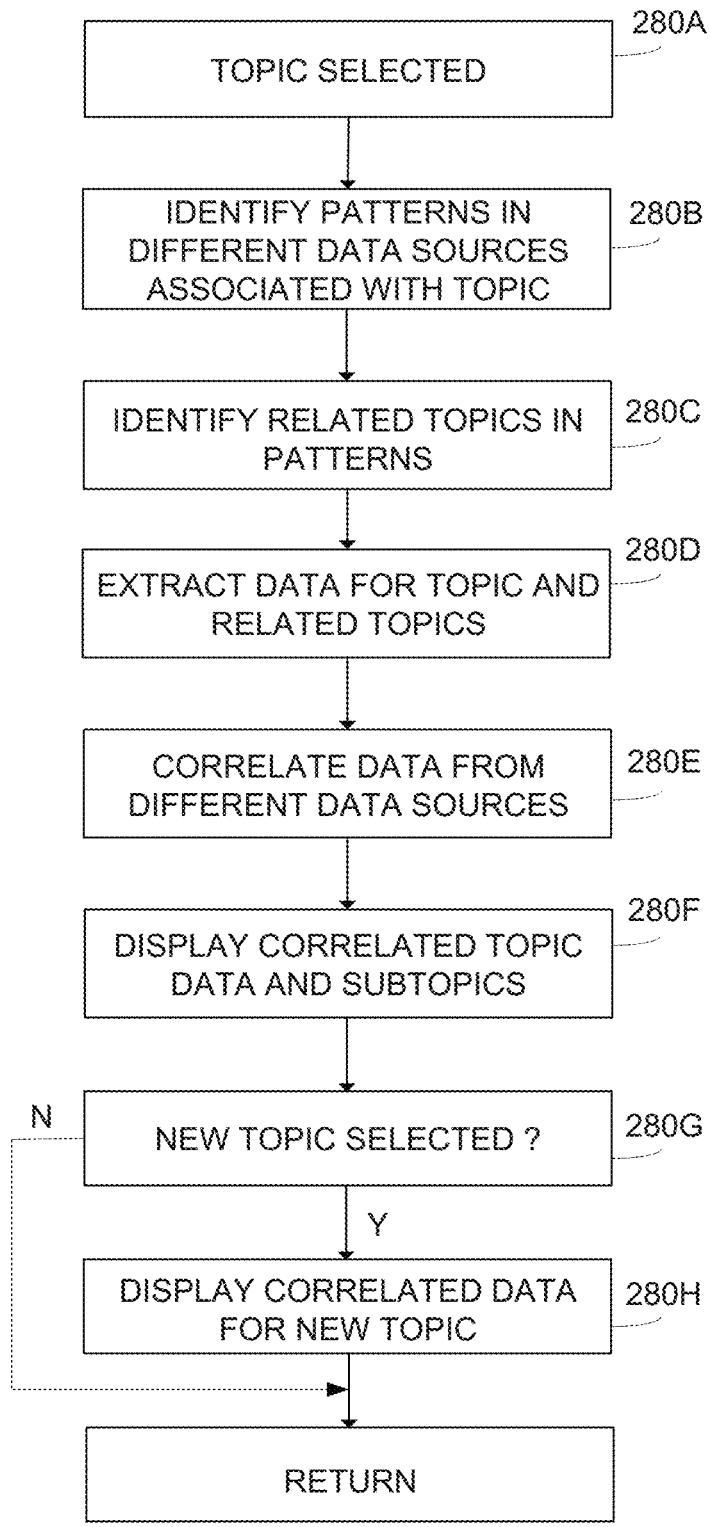
FIG. 9 depicts an example process for correlating topics.

FIG. 9 depicts an example process for dynamically identifying topics and correlating data for the identified topics. Referring to FIGS. 7, 8, and 9, command center 100 dynamically correlates data from disparate data sources 112 with different topics 260. The user may identify the primary topic and command center 100 may automatically identify related topics. A user simply enters a topic 260 into remote control device 110 to view the correlated data associated with that topic 260. Command center 100 enables users to dynamically navigate and view correlated data for other related topics 260 simply by selecting topic inputs on remote control device 110.

In operation 280A of FIG. 9, command center 100 may detect selection of a topic. For example, the user may enter a topic name into device 110 as described above in FIG. 8. In operation 280B, command center 100 may identify patterns in different data sources 112 based on data structures used in data sources 112.

For example, a first data source 112 may include structured data from a company website. As explained above, the website may have a root directory associated with the company and include subdirectories for different products, services, or activities associated with the company. The subdirectories for the different products, services, or other activities may include additional subdirectories for associated campaigns, activities, etc.

Command center 100 may use the root directory and subdirectories to identify related topics. In the example above, the user may select the politician Chris Farris as a primary topic. Command center 100 may search the website operated by Chris Farris and identify a root directory and subdirectories on the website identifying different political topics. For example, one sub-directory may relate to foreign policy and a second sub-directory may relate to immigration. In operation 280C, the command center may identify both foreign policy and immigration as topics related to Chris Farris.

In operation 280D, command center 100 extracts data for the identified topics. In this example, command center 100 may extract metric, image, and/or any text data from the Chris Farris website related to foreign policy and immigration.

Data center 100 may use webpage analytics to help identify patterns and related topics. For example, web analytic services may identify the number of visits, clicks, dwell times, data selections, etc. for webpages. Command center 100 may extract data and identify topics from the directory names and webpages with the most visited webpages.

Command center 100 may identify other patterns and topics for data sources 112 with other data structures. For example, command center 100 also may search a social media account @Chris Farris. The social media account may not have a directory structure with a root directory and subdirectories like the privately operated website. Command center 100 may identify patterns in the social media account based on conversations, influencers, keywords, hashtags, message reuse, or the like, or any combination thereof.

For example, some social media websites identify messages or accounts with the largest number of likes or highest trending scores. Social media websites also may identify messages posted by users with the largest number of followers or largest influence. Social media messages also may include links, hashtags, accounts, and other content.

In operation 280B, command center 100 may identify patterns and related topics based on the conversations, number of likes, influencers, keywords, hashtags, content, etc. associated with the messages in the social media account. For example, command center 100 may identify messages posted in the @Chris Farris account from large influencers or with a large number of likes. The messages may repeatedly refer to campaign funding. Command center 100 may identify campaign funding as a new topic associated with Chris Farris.

In the operation 280D, command center 100 extracts data for the topic selected by the user and may extract data for related topics. For example, command center 100 may extract and store metrics, text, and images for the selected topic Chris Farris, and also extract and store metrics, text, and images for the dynamically identified related topics of foreign policy, immigration, and campaign funding.

In operation 280E, command center 100 may correlate the data extracted from the different data sources 112. As explained above, command center 100 may use timestamps to correlate the different data with a same time period. For example, command center 100 may identify metrics from a first structured data source 112 identifying website usage on the Chris Farris private website for each hour of the day. Command center 100 also may identify messages from the @Chris Farris social media account posted by the biggest influencers or with the most likes. Command center 100 identifies the messages with timestamps for the same hour time periods during the same day.

In operation 280F, command center 100 displays the correlated data for the selected topic and for possibly related topics. As explained above, some display modules 142 may display data related to a user-selected topic, such as for topic Chris Farris. For example, one display module 142 may display the metrics for the webpage usage metrics from the Chris Farris private website and a second display module 142 may display the most popular messages posted on the @Chris Farris social media account.

Other display modules 142 may display content for related topics. For example, as described above in FIG. 8, the user may have entered three topics 260A-260C into remote control device 110 for Chris Farris, Mary Hartson, and Kevin Mason, respectively. One display module 142 may display metrics that show the number of messages posted each hour on Chris Farris, Mary Hartson, and Kevin Mason social media accounts.

Another display module may display the dynamically discovered topics for foreign policy, immigration, and campaign funding. The display module correlates the foreign policy, immigration, and campaign funding topics in time with the other data for Chris Farris, Mary Hartson, and Kevin Mason.

In operation 280G, the user may select a new topic. For example, the user may select one of the other politician topics 260B or 260C displayed on remote control device 110 in FIG. 8 or the user may manually enter a new topic into remote control device 110. The user also may select topics that command center 100 automatically discovered while searching for previous topics and then displayed on user interface 240 of remote control device 110.

In operation 280H, command center 100 searches and displays the data for the new topic. For example, remote control application 156 sends the selected topic to display modules 142 that then request and display the data associated with the new topic.

In another example, the user may want to track a candidate debate between three politicians. The user may enter the three politician topics 260A-260C into remote control application 156 as described above in FIG. 8. Remote control application 156 may cause command center 100 to search and display data related to all three politicians 260A-260C. During the debate, one of display modules 142 may track the number of messages on a social media site for each of the politicians. The number of messages may spike for politician Mary Hartson during the debate.

The user may use remote control application 156 to select view icon 262B in FIG. 8 to view additional data for Mary Hartson. Command center 100 may display messages posted on the @Mary Hartson social media account that refer positively to a comment made by Mary Hartson during the debate. Command center 100 also may display metrics from the @Mary Hartson social media account that also indicate a large number of people liked the posted message. Thus, command center 100 may identify in real-time the overall positive or negative public response to comments made during the debate.

The following are example types of data and metrics command center 100 may use to identify data related to a topic and identify other topics related to a selected topic.

A. User Generated Content (UGC) Posts
1. Volume by network by date
2. Stream of all posts, list and Geo
3. Total Posts
4. Impressions
5. Top Influencers that have used a hashtag sorted by followers
6. Top Posts that used hashtag sorted by engagement
7. Top Hashtags also mentioned in posts by popularity
8. Top Keywords in posts by popularity
9. Top @Replies in posts by popularity
10. Network by volume
11. Audience Attitude (sentiment)

B. Brand
1. Followers by Network for brand
2. Top Posts posted by brand using the hashtag sorted by engagement
3. Number of posts by network for brand posts using the hashtag
4. Klout influence score for brand C. Demographics of Participants
1. Gender by percentage
2. Age range by percentage
3. Income by percentage
4. Ethnicity by percentage
5. Countries by percentage sorted by popularity
6. State/Province by percentage sorted by popularity
7. City by percentage sorted by popularity
8. Top Interests sorted by popularity
9. Top Brands sorted by popularity
10. Top Influencers (of that audience) sorted by popularity
11. Top TV Shows sorted by popularity The user may configure command center 100 to display content for different time periods, such as for each hour over 24 hours, or for each minute over an hour. Display modules 142 then may request and display metrics for the selected topics for the configured time periods.

Command center 100 may display data with background images and colors associated with the topic. For example, command center 100 may identify the root page for a topic associated with a corporation or brand. Command center 100 may extract a portion of the root webpage for displaying as background on display devices 104 providing a similar look and feel for the corporation or brand. Command center 100 also may identify a primary color on the root webpage and use that primary color to display metrics for that corporation or brand. These social media display enhancements are also described in U.S. provisional application, Ser. No. 62/165,479 which is incorporated by reference in its entirety.

Hardware and Software

Figure 10:
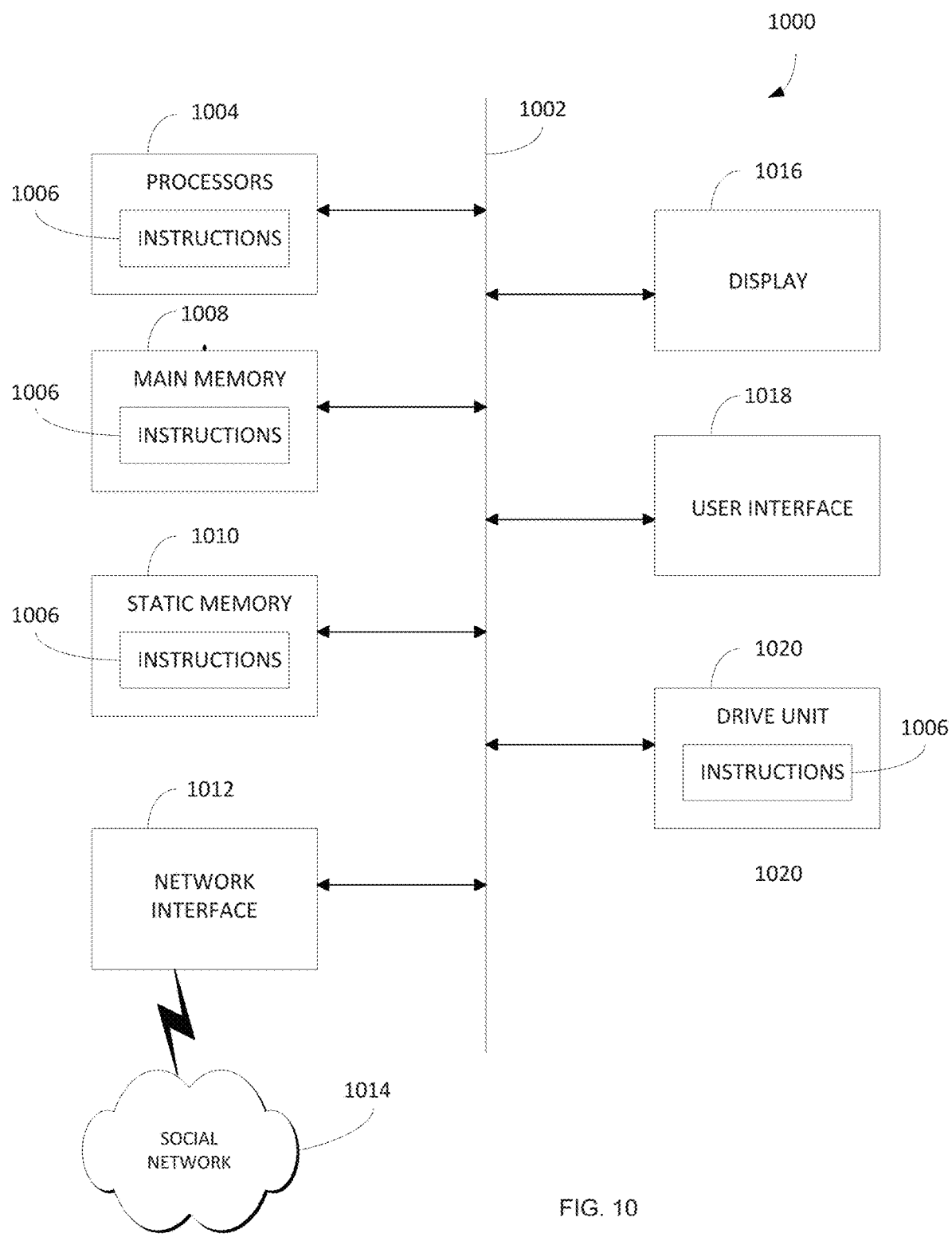
FIG. 10 depicts an example computing device used in the command center.

FIG. 10 shows a computing device 1000 that may be used for operating the command center computing devices and performing any combination of processes discussed above. The computing device 1000 may operate in the capacity of a server or a client machine in a server-client network environment, or as a peer machine in a peer-to-peer (or distributed) network environment. In other examples, computing device 1000 may be a personal computer (PC), a tablet, a Personal Digital Assistant (PDA), a cellular telephone, a smart phone, a web appliance, or any other machine or device capable of executing instructions 1006 (sequential or otherwise) that specify actions to be taken by that machine.

While only a single computing device 1000 is shown, the computing device 1000 may include any collection of devices or circuitry that individually or jointly execute a set (or multiple sets) of instructions to perform any one or more of the operations discussed above. Computing device 1000 may be part of an integrated control system or system manager, or may be provided as a portable electronic device configured to interface with a networked system either locally or remotely via wireless transmission.

Processors 1004 may comprise a central processing unit (CPU), a graphics processing unit (GPU), programmable logic devices, dedicated processor systems, micro controllers, or microprocessors that may perform some or all of the operations described above. Processors 1004 may also include, but may not be limited to, an analog processor, a digital processor, a microprocessor, multi-core processor, processor array, network processor, etc.

Some of the operations described above may be implemented in software and other operations may be implemented in hardware. One or more of the operations, processes, or methods described herein may be performed by an apparatus, device, or system similar to those as described herein and with reference to the illustrated figures.

Processors 1004 may execute instructions or "code" 1006 stored in any one of memories 1008, 1010, or 1020. The memories may store data as well. Instructions 1006 and data can also be transmitted or received over a network 1014 via a network interface device 1012 utilizing any one of a number of well-known transfer protocols.

Memories 1008, 1010, and 1020 may be integrated together with processing device 1000, for example RAM or FLASH memory disposed within an integrated circuit microprocessor or the like. In other examples, the memory may comprise an independent device, such as an external disk drive, storage array, or any other storage devices used in database systems. The memory and processing devices may be operatively coupled together, or in communication with each other, for example by an I/O port, network connection, etc. such that the processing device may read a file stored on the memory.

Some memory may be "read only" by design (ROM) by virtue of permission settings, or not. Other examples of memory may include, but may be not limited to, WORM, EPROM, EEPROM, FLASH, etc. which may be implemented in solid state semiconductor devices. Other memories may comprise moving parts, such a conventional rotating disk drive. All such memories may be "machine-readable" in that they may be readable by a processing device.

"Computer-readable storage medium" (or alternatively, "machine-readable storage medium") may include all of the foregoing types of memory, as well as new technologies that may arise in the future, as long as they may be capable of storing digital information in the nature of a computer program or other data, at least temporarily, in such a manner that the stored information may be "read" by an appropriate processing device. The term "computer-readable" may not be limited to the historical usage of "computer" to imply a complete mainframe, mini-computer, desktop, wireless device, or even a laptop computer. Rather, "computer-readable" may comprise storage medium that may be readable by a processor, processing device, or any computing system. Such media may be any available media that may be locally and/or remotely accessible by a computer or processor, and may include volatile and non-volatile media, and removable and non-removable media.

Computing device 1000 can further include a video display 1016, such as a liquid crystal display (LCD) or a cathode ray tube (CRT)) and a user interface 1018, such as a keyboard, mouse, touch screen, etc. All of the components of computing device 1000 may be connected together via a bus 1002 and/or network.

For the sake of convenience, operations may be described as various interconnected or coupled functional blocks or diagrams. However, there may be cases where these functional blocks or diagrams may be equivalently aggregated into a single logic device, program or operation with unclear boundaries.

Having described and illustrated the principles of a preferred embodiment, it should be apparent that the embodiments may be modified in arrangement and detail without departing from such principles. Claim is made to all modifications and variation coming within the spirit and scope of the following claims.

The invention claimed is:

1. A system for correlating and displaying data from disparate data sources with different data structures, wherein one of the disparate data sources comprises an online social network, the system comprising:
   an application programming interface (API) configured to access real-time streaming data from the online social network, wherein the real-time streaming data includes content of social media messages and metadata of the social media messages;
   a processor; and
   storage memory storing one or more stored sequences of instructions which, when executed by the processor, cause the processor to, in response to receiving a selection, from a remote control device, of a topic or a category including the topic, perform operations comprising:
   generating a set of search terms associated with the selected topic or category, wherein the set of search terms includes a first search term for a first data source of the disparate data sources with the different data structures and a second search term for a second data source of the disparate data sources with the different data structures, wherein the second search term is different than the first search term;
   searching the disparate data sources using the search terms, respectively, for disparate data items associated with the selected topic or category, wherein the disparate data items include metrics associated with the topic or category and messages referring to the topic or category;
   identifying additional topics from an individual one of the disparate data sources and then extracting data from more than one of the disparate data sources using the additional topics, wherein the individual one of the disparate data sources comprises a website with a directory structure, and wherein identifying the additional topics from the individual one of the disparate data sources includes identifying, in the directory structure, a root directory that corresponds to the selected topic or category and then identifying the additional topics from subdirectories, respectively, of the root directory;
   wherein at least a portion of the extracted data is collected via the API, and wherein the extracted data includes additional disparate data items associated with the additional topics, the additional disparate data items from the disparate data sources and including metrics associated with the additional topics and messages referring to the additional topics;

correlating data items, including the disparate data items and the additional disparate data items, over a same time period; and displaying the correlated data items in different sections of a display device.

2. The system of claim 1, wherein the directory structure comprises a URL hierarchy.

3. The system of claim 1, identifying additional topics is further based on a data pattern corresponding to a data structure of a different individual one of the disparate data sources, wherein the data structure comprises links indicated by user generated content tags contained in the different individual one of the disparate data sources, and the operations further comprise identifying at least one of the additional topics using the links.

4. The system of claim 3, wherein the data items, including the disparate data items and the additional disparate data items comprise information identified in response to a first search, and wherein the operations further comprise, in response to receiving a selection of one of the additional topics and from the remote control device:

searching, in a second search following the first search, the disparate data sources for additional information associated with the selected additional topic;

correlating the additional information over the same time period; and displaying the correlated additional information in the different sections of the display device.

5. The system of claim 1, wherein the selection comprises a category selection, and the operations further comprise:

searching the disparate data sources for information associated with multiple topics;

correlating the information associated with the multiple topics over the same time period; and displaying the correlated information associated with the multiple topics on the display device.

6. The system of claim 1, wherein the selection comprises a voice command.

7. The system of claim 1, wherein the additional disparate data items contain content and metadata, and wherein the content does not explicitly refer to said topic.

8. A method of correlating and displaying data from disparate data sources with different data structures, wherein one of the disparate data sources comprises an online social network the method utilizes an application programming interface (API) configured to access real-time streaming data from the online social network, wherein the real-time streaming data includes content of social media messages and metadata of the social media messages, the method comprising:

generating a set of search terms associated with a selected topic or category from a user terminal, wherein the set of search terms includes a first search term for a first data source of the disparate data sources with the different data structures and a second search term for a second data source of the disparate data sources with the different data structures;

searching, by one or more computer processors, the disparate data sources using the search terms, respectively, for disparate data items associated with the selected topic or category, wherein the disparate data items include metrics associated with the topic or category and messages referring to the topic or category;

identifying, by the one or more computer processors, additional topics from an individual one of the disparate data sources and then extracting data from more than one of the disparate data sources using the additional topics, wherein the individual one of the disparate data sources comprises a website with a directory structure, and wherein identifying the additional topics from the individual one of the disparate data sources includes identifying, in the directory structure, a root directory that corresponds to the selected topic or category and then identifying the additional topics from subdirectories, respectively, of the root directory;

wherein at least a portion of the extracted data is collected via the API, and wherein the extracted data includes additional disparate data items associated with the additional topics, the additional disparate data items from the disparate data sources and including metrics associated with the additional topics and messages referring to the additional topics;

correlating, by the one or more computer processors, data items, including the disparate data items and the additional disparate data items, over a same time period; and displaying the correlated data items in different sections of a display device associated with the user terminal.

9. The method of claim 8, wherein the directory structure comprises a URL hierarchy.

10. The method of claim 8, wherein the identifying the additional topics is further based on a data pattern corresponding to a data structure of a different individual data source of the disparate data sources, wherein the data structure comprises links indicated by user generated content tags contained in the different individual data source of the disparate data sources, and the method further comprises identifying at least one of the additional topics using the links.

11. The method of claim 10, wherein the data items, including the disparate data items and the additional disparate data items comprise information identified in response to a first search, and wherein the method further comprises, in response to receiving a selection of one of the additional topics and from the user terminal:

searching, in a second search following the first search, the disparate data sources for additional information associated with the selected additional topic;

correlating the additional information over the same time period; and displaying the correlated additional information in the different sections of the display device.

12. The method of claim 8, wherein the selection comprises a category selection, and the method further comprises:

searching the disparate data sources for information associated with multiple topics;

correlating the information associated with the multiple topics over the same time period; and displaying the correlated information associated with the multiple topics on the display device.

13. The method of claim 8, wherein the selection comprises a voice command.

14. The method of claim 8, wherein the additional disparate data items contain content and metadata, and wherein the content does not explicitly refer to said topic.

15. The method of claim 8, wherein the second search term is different than the first search term.

16. An apparatus for correlating and displaying data from disparate data sources with different data structures, wherein one of the disparate data sources comprises an online social network, the apparatus configured to interoperate with an application programming interface (API) configured to access real-time streaming data from the online social network, wherein the real-time streaming data includes content of social media messages and metadata of the social media messages, the apparatus comprising:

a processor; and storage memory storing one or more stored sequences of instructions which, when executed by the processor, cause the processor to, in response to receiving a selection, from a remote control device, of a topic or a category including the topic, perform operations comprising:

generating a set of search terms associated with the selected topic or category, wherein the set of search terms includes a first search term for a first data source of the disparate data sources with the different data structures and a second search term for second data source of the disparate data sources with the different data structures, wherein the second search term is different than the first search term;

searching the disparate data sources using the search terms, respectively, for disparate data items associated with the selected topic or category, wherein the disparate data items include metrics associated with the topic or category and messages referring to the topic or category;

identifying additional topics from an individual one of the disparate data sources and then extracting data from more than one of the disparate data sources using the additional topics, wherein the individual one of the disparate data sources comprises a website with a directory structure, and wherein identifying the additional topics from the individual one of the disparate data sources includes identifying, in the directory structure, a root directory that corresponds to the selected topic or category and then identifying the additional topics from subdirectories, respectively, of the root directory;

wherein at least a portion of the extracted data is collected via the API, and wherein the extracted data includes additional disparate data items associated with the additional topics, the additional disparate data items from the disparate data sources and including metrics associated with the additional topics and messages referring to the additional topics;

correlating data items, including the disparate data items and the additional disparate data items, over a same time period; and displaying the correlated data items in different sections of a display device.

17. The apparatus of claim 16, wherein the directory structure comprises a URL hierarchy.

18. The apparatus of claim 16, wherein the identifying the additional topics is further based on a data pattern corresponding to a data structure of a different individual one of the disparate data sources, wherein the data structure comprises links indicated by user generated content tags contained in the different individual one of the disparate data sources, and the operations further comprise identifying at least one of the additional topics using the links.

19. The apparatus of claim 18, wherein the data items, including the disparate data items and the additional disparate data items comprise information identified in response to a first search, and wherein the operations further comprise, in response to receiving a selection of one of the additional topics and from the remote control device:

searching, in a second search following the first search, the disparate data sources for additional information associated with the selected additional topic;

correlating the additional information over the same time period; and displaying the correlated additional information in the different sections of the display device.

20. The apparatus of claim 16, wherein the selection comprises a category selection, and the operations further comprise:

searching the disparate data sources for information associated with multiple topics;

correlating the information associated with the multiple topics over the same time period; and displaying the correlated information associated with the multiple topics on the display device.

21. The apparatus of claim 16, wherein the selection comprises a voice command.

22. The apparatus of claim 16, wherein the additional disparate data items contain content and metadata, and wherein the content does not explicitly refer to said topic.

* * * * *